US011165988B1

(12) United States Patent
Verna et al.

(10) Patent No.: US 11,165,988 B1
(45) Date of Patent: Nov. 2, 2021

(54) SYSTEM AND METHODS PROVIDING SUPPLEMENTAL CONTENT TO INTERNET-ENABLED DEVICES SYNCHRONIZED WITH RENDERING OF ORIGINAL CONTENT

(71) Applicant: Stripe, Inc., San Francisco, CA (US)

(72) Inventors: Anthony F. Verna, Palm Dessert, CA (US); Luis M. Ortiz, Alburquerque, NM (US)

(73) Assignee: STRIPE, INC., San Francisco, CA (US)

( * ) Notice: Subject to any disclaimer, the term of this patent is extended or adjusted under 35 U.S.C. 154(b) by 0 days.

(21) Appl. No.: 17/001,055

(22) Filed: Aug. 24, 2020

Related U.S. Application Data (63) Continuation of application No. 16/575,186, filed on Sep. 18, 2019, now Pat. No. 10,757,359, which is a (Continued)

(51) Int. Cl.
  *H04N 7/16* (2011.01)
  *H04N 5/781* (2006.01)
  (Continued)

(52) U.S. Cl.
  CPC ......... *H04N 5/781* (2013.01); *H04N 21/2187* (2013.01); *H04N 21/232* (2013.01);
  (Continued)

(58) Field of Classification Search
  CPC ........... H04N 21/6543; H04N 21/2665; H04N 21/4126; H04N 21/4307; H04N 21/6125;
  (Continued)

(56) References Cited

U.S. PATENT DOCUMENTS 5,189,630 A  2/1993 Barstow
5,377,051 A  12/1994 Lane
(Continued)

OTHER PUBLICATIONS

Decker, J.C., "Analysis Architecture of a Mobile Sports Replay System," 20th International Conference on Advanced Information Networking and Applications Apr. 18-20, 2006, AINA 2006, 6 pages. (Abstract).

(Continued)

*Primary Examiner* — Robert Chevalier
(74) *Attorney, Agent, or Firm* — Womble Bond Dickinson (US) LLP (57) ABSTRACT

An electronic device can be synchronized with a broadcast of a live sporting event to obtain supplemental sports data over a data network from a server storing data associated with the live sporting event. Supplemental sports data is obtained from the server for display on the electronic device following a triggering activity associated with the broadcast of the live sporting event. Supplemental sports data can be transmitted for rendering on a display associated with the electronic device. Supplemental sports data can include display of an instant replay video of a sports athlete combined with audio of a pre-recorded statement by the sports athlete associated with the instant replay video, an announcement of a score change for a sporting event monitored by the electronic device, and a display of a football widget providing updates on football game status (e.g., possession, ball location, current score) monitored by the electronic device.

21 Claims, 8 Drawing Sheets

Related U.S. Application Data continuation of application No. 14/701,833, filed on May 1, 2015, now Pat. No. 10,425,613, which is a continuation of application No. 13/455,355, filed on Apr. 25, 2012, now Pat. No. 9,055,271, which is a continuation of application No. 12/407,916, filed on Mar. 20, 2009, now Pat. No. 8,244,105.

(60) Provisional application No. 61/499,623, filed on Jun. 21, 2011, provisional application No. 61/038,127, filed on Mar. 20, 2008.

(51) Int. Cl.

| | | |
|---|---|---|
| *H04N 21/232* | (2011.01) | |
| *H04N 21/2187* | (2011.01) | |
| *H04N 21/242* | (2011.01) | |
| *H04N 21/254* | (2011.01) | |
| *H04N 21/2665* | (2011.01) | |
| *H04N 21/41* | (2011.01) | |
| *H04N 21/43* | (2011.01) | |
| *H04N 21/488* | (2011.01) | |
| *H04N 21/61* | (2011.01) | |
| *H04N 21/6543* | (2011.01) | |
| *H04N 21/81* | (2011.01) | |
| *H04N 21/2368* | (2011.01) | |
| *H04N 5/935* | (2006.01) | |

(52) U.S. Cl.
CPC ....... *H04N 21/2368* (2013.01); *H04N 21/242* (2013.01); *H04N 21/2541* (2013.01); *H04N 21/2665* (2013.01); *H04N 21/4122* (2013.01); *H04N 21/4126* (2013.01); *H04N 21/4307* (2013.01); *H04N 21/488* (2013.01); *H04N 21/6125* (2013.01); *H04N 21/6543* (2013.01); *H04N 21/812* (2013.01); *H04N 21/8133* (2013.01)

(58) Field of Classification Search
CPC ............. H04N 21/232; H04N 21/2368; H04N 21/242; H04N 21/2541; H04N 21/2187; H04N 21/4122; H04N 21/8133; H04N 21/488; H04N 21/812; H04N 5/781
USPC ........................ 725/28, 29, 31; 386/200, 201
See application file for complete search history.

(56) References Cited

U.S. PATENT DOCUMENTS

| | | |
|---|---|---|
| 5,526,479 A | 6/1996 | Barstow |
| 6,144,375 A | 11/2000 | Jain |
| 6,216,141 B1 | 4/2001 | Straub |
| 6,414,725 B1 | 7/2002 | Clarin |
| 6,504,990 B1 | 1/2003 | Abecassis |
| 7,430,360 B2 | 9/2008 | Abecassis |
| 7,490,295 B2 | 2/2009 | Chaudhri |
| 7,509,021 B2 | 3/2009 | Mughal |
| 7,882,258 B1 | 2/2011 | Sumler |
| 8,009,966 B2 | 8/2011 | Bloom |
| 9,055,271 B2 | 6/2015 | Verna |
| 10,757,359 B1 * | 8/2020 | Verna ................. H04N 21/6543 |
| 2002/0114613 A1 | 8/2002 | Thai |
| 2003/0008711 A1 | 1/2003 | Corbo |
| 2006/0291817 A1 | 12/2006 | Mughal |
| 2007/0061724 A1 | 3/2007 | Slothouber |
| 2007/0143820 A1 | 6/2007 | Pawlowski |
| 2007/0162850 A1 | 7/2007 | Adler |
| 2007/0288614 A1 * | 12/2007 | May ..................... G06F 16/273 |
| | | 709/223 |
| 2008/0008458 A1 | 1/2008 | Gudipaty |
| 2008/0043089 A1 | 2/2008 | Auerbach |
| 2008/0060001 A1 | 3/2008 | Logan |
| 2009/0017749 A1 | 1/2009 | Braun |
| 2009/0144785 A1 | 6/2009 | Walker |
| 2009/0187826 A1 | 7/2009 | Heimbold |
| 2010/0131464 A1 | 5/2010 | Geleijnse |
| 2011/0093608 A1 | 4/2011 | Sumler |
| 2011/0214045 A1 | 9/2011 | Sumler |

OTHER PUBLICATIONS

Hayden, T., "Empowering sports fans with technology," Computer (2004) 37(9)106-107, Sept. (Abstract).
Football Play by Play Tracker, Mar. 17, 2004, http://web.archive.org/web/20040401214528/wheelbarrowsoftware.com/fpbpt.htm.
Front Office Football 2004, Solecismic Software, Jan. 15, 2006, http://web.archive.org/web20060105042536/www.solecismic.com/fof/index.php.
Meridix Broadcast Producer, Feb. 2005, http://web.archive.org/web/20050204015856/www.meridix.com/golive.com.
Ming Xu, Liam Lowey, James Orwell, Architecture and Algorithms for Tracking Football Players with Multiple Cameras, 2004, 5 pages.

* cited by examiner

SYSTEM AND METHODS PROVIDING SUPPLEMENTAL CONTENT TO INTERNET-ENABLED DEVICES SYNCHRONIZED WITH RENDERING OF ORIGINAL CONTENT

CROSS-REFERENCE TO RELATED APPLICATIONS

This patent application is a continuation of U.S. patent application Ser. No. 16/575,186, which was filed on Sep. 18, 2019, which is a continuation of U.S. patent application Ser. No. 14/701,833, which was filed on May 1, 2015, which is a continuation of U.S. patent application Ser. No. 13/455,355 entitled "System and Methods Providing Sports Event Related Media to Internet-Enabled Devices Synchronized with a Live Broadcast of the Sports Event," which was filed on Apr. 25, 2012, each of which are incorporated herein by reference in their entirety.

U.S. patent application Ser. No. 13/455,355 is in turn a Continuation-in-Part of U.S. patent application Ser. No. 12/407,916 filed Mar. 20, 2009 and entitled "Talking Replay", which is a continuation of provisional patent application Ser. No. 61/038,127, filed Mar. 20, 2008, both applications of which are incorporated herein by reference in their entireties.

U.S. patent application Ser. No. 13/455,355 also claimed priority from U.S. Provisional Patent Application Ser. No. 61/499,623, filed Jun. 21, 2011, entitled "Method, System and Processor-Readable Media for Automatically Vocalizing User Pre-Selected Sporting Event Scores", which is incorporated by herein reference in its entirety.

U.S. patent application Ser. No. 13/455,355 is further related to U.S. non-provisional patent application Ser. No. 11/799,874 filed May 3, 2007, entitled "Instant Football Widget", which issued as U.S. Pat. No. 7,596,759, and which is incorporated by reference herein for its teaching.

TECHNICAL FIELD

The present invention is generally related to the transmission of sport event related media, including video and audio data, over data communication networks for rendering on electronic devices. More particularly, the present invention is related to a method of selecting and linking audio comments of a sports athlete recorded prior to the athlete performing in a live sporting event to a video recorded of action performed by the sports athlete during the live sporting event, wherein the audio comments specifically relate to the video of action performed by the sports athlete, and transmitting the combination of audio and video of the sports athlete within a live telecast and/or over a data network to electronic devices used by observers of a live broadcast of the sporting event, wherein the combination of audio and video of the sports athlete is a talking replay.

BACKGROUND

Instant Replay was invented by Tony Verna in 1963 and first used in a football game between the U.S. Military Academy and the Naval Academy. Tony Verna is also an inventor of the present invention. The purpose of instant replays is to review action that has taken place in a live event immediately after the action occurs. Throughout the decades since it was first introduced, the Instant Replay has been in continual use as a form of video review, from the announcer's point of view, during a sporting event. Through the years, the Instant Replay has visually evolved but the nature of commenting over instant replays has fundamentally remained unchanged. The Instant Replay has also been used in the broadcast of entertainment events other than sports.

In sports competition such as football, basketball, and most other sports, every player is involved in every play in some manner, so that it becomes interesting to isolate a player's thinking before the actual game takes place. Players have to be constantly thinking in order to execute the hundreds of variations of their offensive and defensive schemes. It would be of great interest to the fans to experience the game from the player's point of view. It would allow a player to convey his or her unique viewpoint, so that the fans can personally identify with him/her. The Talking Replay specifically taps into the player's insights, which heretofore have remained silent during a broadcast. Now a player will be able to provide a pre-recorded audio comment over a recorded video replay of a related action that took place after the pre-recorded audio comment during a live event.

Currently, there does not exist a television procedure or software application currently that allows the production team of a live broadcast to interject a sports athlete's comments into an instant replay of action by the sports athlete recorded from a live broadcast of a sporting event occurring after recording of the sport athlete's comments. There are no prior procedures in sports broadcasting whereby the pre-recorded audio recorded of an athlete is linked to a related video recording (Instant Replay) of the athlete from a broadcast of a sporting event being aired after the pre-recorded audio is obtained from a sports athlete, so that the sports athlete's personal comments can enlighten, or perhaps even correct, the game's storyline that is currently being presented by the announcing team's third-person approach.

Tony Verna has also invented the Instant Football Widget described in U.S. Pat. No. 7,596,759, and Spoken Scores, described in provisional patent application Ser. No. 61/499,623. The Instant Football Widget allows scores, football direction of play, and real time spoiling of the football location to be shown in a small footprint summary in the form of a simple graphic on a display screen, and includes the capability for expansion with addition real-time game information. Spoken Scores is technology that allows various games of interest to a user to be monitored by a service and then push as a text message to a handheld device where it can be converted into a spoken score for announcement over the device. Both of these innovations by Tony Verna can be incorporated as features into the present invention.

BRIEF SUMMARY

The present invention can tap into the player's insights, which heretofore have remained silent during a live broadcast. A talking replay provides a method of optimizing the recorded voice of the sports athlete so that fans can hear what the athlete may have been thinking as fans take another look at what has just happened after the recorded voice is obtained from the sports athlete, thus providing a new form of communication for traditional sports broadcasts and can generate traffic through broadcaster partnerships with worldwide affiliates, websites, and with the possibility of amassing thousands of viral views on social media.

It is a feature of the present invention to provide a method for transmitting at least one pre-recorded audio stream together with a video instant replay of a live event to a data communications network-enabled device such as a second screen during broadcasting of the live event for viewing on a primary screen, which can also be communicated either synchronously or asynchronously. An example of this implementation is where the voice of a football player (e.g., quarterback, linebacker) can be acquired and stored for future retrieval with video of the same football player that can be selected for instant replay, and can be selected because of its correlation of observable action to what has been pre-recorded on audio. Audio and video of the same football player are combined and available from a server to be received and can be replayed by a team fan as what can be referred to as a "Talking Replay" on the fan's notebook computer while a live broadcast of the football game is simultaneously being viewed on the fan's large, flat-panel display. Although provided during the broadcast, synchronization with the broadcast is not necessarily required. Furthermore, a Talking Replay can be provided within a telecast/broadcast to televisions (e.g., HDTV flat panels) over cable, satellite, and radio frequency transmissions.

It is another feature of the present invention to provide a method for recording, prior to the live sporting event, the comments of individuals who will be participating in the live event, storing the recorded audio stream comments in a server, accessing the audio stream from the server during the live event, combining or linking the audio stream with a video instant replay of a portion of the live event, and transmitting a combined module of prerecorded audio stream and video instant replay to data communication network-enabled devices (e.g., second screens such as those offered by smartphones, tablet computing devices, or large, stationary flat panel displays). Transmission of the combined data can be synchronized with a live broadcast of the live sporting event or non-synchronized and can be pushed to the receiving electronic devices. Delivery of the media is during the live broadcast/telecast of the live event.

It can also be a feature of the present invention to provide a method for obtaining score data and providing it to data communication network-enabled devices for announcement.

It can also be yet another feature of the present invention to provide an instant football widget that provides field location and direction for a football on a playing field in a condensed expandable format (e.g., MPEG) for display on data communication network-enabled devices.

It is another feature to store all data in cloud storage for ease of user authentication, security of data, and streamlined, simultaneous access by numerous authorized users.

BRIEF DESCRIPTION OF THE DRAWINGS

The accompanying figures further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java. C++, etc.). The computer program code, however, for carrying out operations of the present invention may also be written in conventional procedural programming languages such as the "C" programming language or in a visually oriented programming environment such as, for example, Visual Basic, or whatever programming language in use to develop data network accessible multimedia for rendering on electronic devices in the future.

The invention is described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

Although not required, the disclosed embodiments will be described in the general context of computer-executable instructions such as program modules being executed by a single computer. In most instances, a "module" constitutes a software application. Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

Through the years, the Instant Replay has benefited from an array of technical breakthroughs such as super slow motion, multiple isolations and the electronic first down line, and even the use of a third dimension. While all of these advancements have helped the Instant. Replay to clarify itself visually, none of these advancements have provided the needed "sensory element" that the Talking Replay brings or that of adding the athlete's voice to his or her immediate playback.

With the use of the Talking Replay, the home audience no longer has to be solely dependent on the announcer's perception. In fact: a recent research study, funded by the Amateur Athletic Foundation of Los Angeles, reported that the phrases announcers use to describe an athlete's inner emotional state are purely speculative, since their third person observation has been taken solely from the athlete's appearance, for instance, "she's a nervous wreck", "quietly confident", "she's completely focused", "feeling proud", "he has fantastic concentration".

The Talking Replay deals with that present moment. As Scientific American Magazine points out in an article, "We are pattern-seeking, storytelling primates trying to make sense of what is currently happening around us . . . and wanting to know what others are feeling at the present moment." The Talking Replay does that.

By providing the athlete's narrative concentration, the Talking Replay, in effect, provides a logical connection, similar to the mental voice experienced when reading a novel. In literature, the use of inner monologues is common and often used to signify the real truth since characters are given the opportunity to stand alone and portray their inner self, their thoughts, and expectations.

The operational method of incorporating Talking Replays into a live event allows it to be implemented in live events of all kinds such as concerts, theater, sportscasts of football, and sportscasts other than football such as auto racing, baseball, basketball, billiards, bowling, cricket, golf, horse racing, ice hockey, ice skating, car racing, motocross, rodeo, rugby, skate boarding, skiing, soccer, swimming and diving, track and field, volleyball, and Canadian Football.

Reference to "sports athlete" herein is meant to be inclusive of performers in the art to the extent instant replay with artist commentary can be utilized. Furthermore, audio recordings can be multilingual and translated into another language for rendering as subtitles on any display whereon Talking Replays are also shown.

In addition, the Talking Replay provides a business opportunity for additional income to the network, the team, the league or other entity televising the game, by selling advertising for its use such as "This Talking Replay is brought to you by XYZ Company" (currently referred to as in-game commercials). Also, the Talking Replays can be made available on the Internet, on specific web sites, with associated advertising.

The Instant Replay has visually evolved through the years, but the nature of commenting over the Instant Replays has remained fundamentally unchanged. The prerecorded athlete's comments (recorded prior to a live event) replayed over their actions at a live event and shown on an instant replay will not only can be expressed in different dialects and with different intonations, but their inner reflections can be delivered as something special to their fans, hungry for something new that can't be found on their sports pages.

Figure 1:
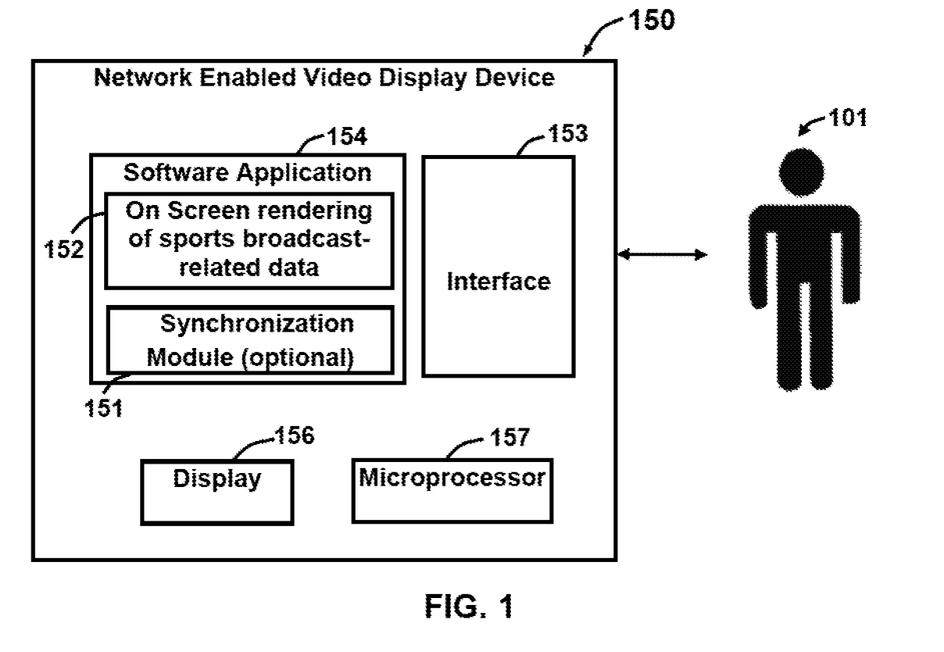
FIG. 1 illustrates a schematic view of a system that includes a customized live tile application module, an operating system, and a user interface, in accordance with features of the present invention.

Referring to FIG. 1, a block diagram of modules can then be used to carry out features of the present invention is shown. A user 101 has access to a network enabled video display device 150 (also referred to as "electronic device") that includes a user interface 153, a microprocessor 157, a display 156, and software applications 154. Software applications are used by the microprocessor for carrying out features of the invention including a software module 152 for rendering sports-related data on the display 156. A synchronization module 151 can be provided to synchronize the electronic device 150 with a live broadcast of a sporting event. Synchronization as used throughout this description means that close synchronization of time between a content in a broadcast and supplemental data provided to electronic devices can be obtained where electronic devices use: short range wireless data communications means (e.g., Bluetooth, 802.xx, RFID, IR) between a handheld device ($2^{nd}$ screen) and a flat panel television (1st screen); audio tags embedded in audio projected from the 1st screen and recognized by the $2^{nd}$ screen; or via communication with a remote server by the handheld device (or $2^{nd}$ screen) over a wired or wireless data network.

Synchronization and the synchronization module are not required features of the present invention. Although synchronization is not a required feature of the present invention, synchronization, if incorporated in the system and methods, can be achieved between a remote server providing data or with a local computing device receiving a live broadcast (e.g., flat panel television set). Unsynchronized data transfer does not require that a synchronization signal such as tags (e.g., voice tags) be used to synchronize broadcasted content on a large screen with content obtained from a remote server for display on a second screen such as a handheld device. Therefore, it can be appreciated that data can be pushed or pulled from the server and can be based on synchronization or not based on synchronization with broadcasted content. What is important is that the second screen information, such as talking replays, occurs during the broadcasted event, and ideally a short time after the event being replayed with the content bearing the voice of the athlete.

The electronic device can be provided in the form of a high definition flat panel display (e.g., flat panel TV), a tablet computer, a laptop computer, a desktop computer, and a smartphone or compatible handheld device. In some instances, as will be explained in more detail below, two screens can be used. A first screen (e.g., flat panel television) can be used to display a live broadcast, while a second screen (e.g., tablet or handheld computer) can be used to display supplemental sports-related data from a server. As mentioned above, the two screens can be synchronized via the synchronization module 151. When synchronized, a triggering event in the live broadcast can cause supplemental sports data including talking replays, score information as text or spoken scores or football widget information depicting the location, and direction of a football on a football field to be displayed on the electronic device 150 after the triggering activity. A triggering activity can be as simple as a determination by a media director that a particular event that occurred during a live event warrants the production and distribution of supplemental sports data associated with the event, or a triggering activity can be an electronic queue (e.g., audio tag) in a broadcast that causes the electronic device to retrieve supplemental information from a remote server and display it.

Figure 2:
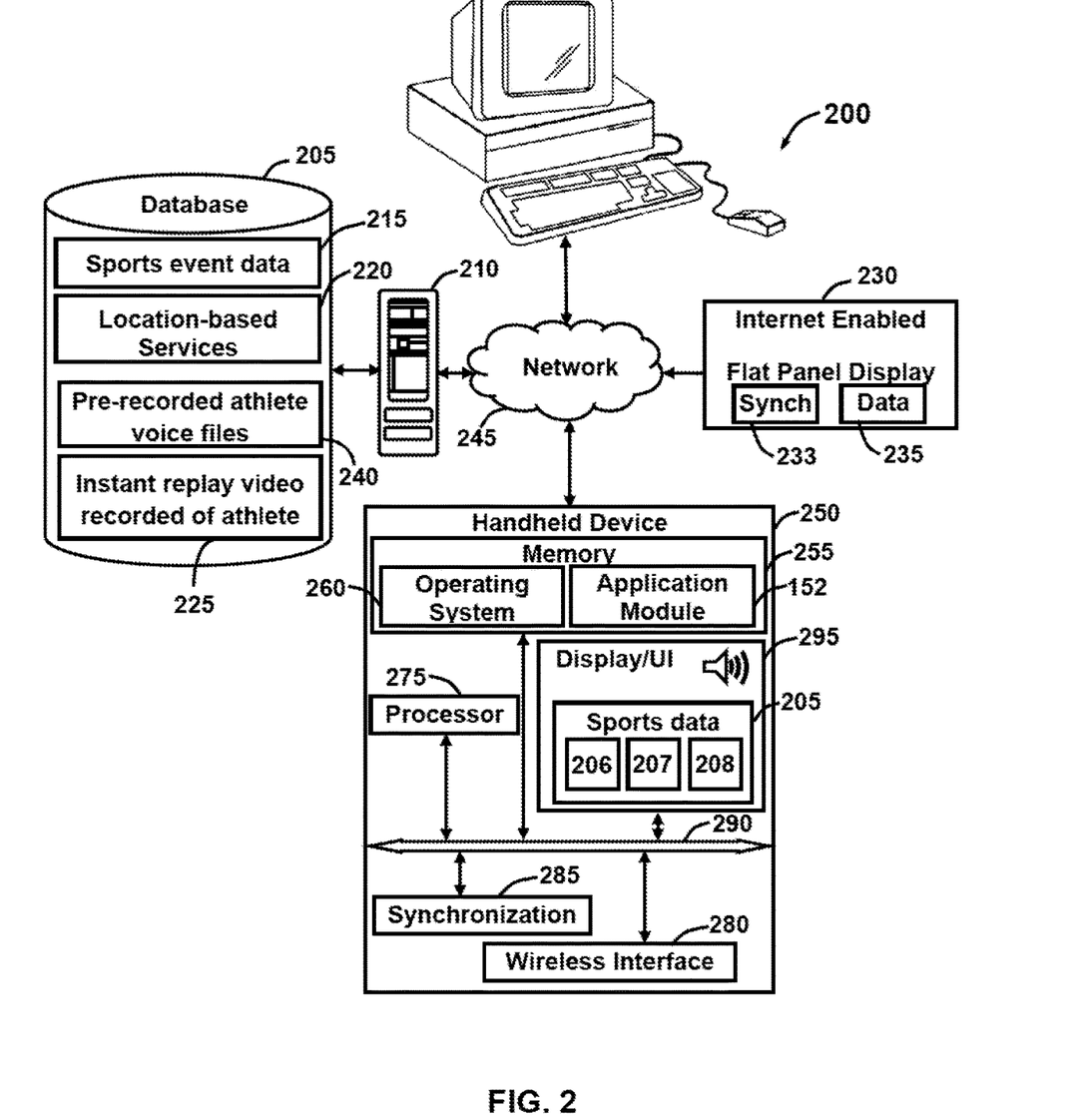
FIG. 2 illustrates a block network diagram of components that can be used to implement and carry out the features of the present invention.

Referring to FIG. 2, a more detailed block diagram of networked systems 200 that can be used to carry out the invention are depicted. At least one database 205 and at least one server 210 in control of media providers (e.g., broadcasters, media owners, directors) can be used to store and manage the flow of sports-related data. A database can be used to store sports event data 215, location-based services 220 and related information, pre-recorded sports athlete voice files 240, and recorded instant replay video of sports athletes 225. A data network 245 supports communication between the at least one server 210 and remote electronic devices 265/230/250.

An electronic device in the form of an internet enabled flat panel display 230 can be provided as a familiar high definition flat panel display system currently being referred to as "smart TVs" and ranging in sizes up to 70 inches diagonally. An Internet enabled flat panel display 230 has data network 245 access and can run software programs in addition to receiving broadcast signals from cable feeds, satellite feeds, and set-top boxes. If synchronization is desired, an Internet enabled flat panel display 230 can include a synchronization module 233 and sports data module 235 to carry out features described above with respect to FIG. 1. Transmission of sports event data 215 can be provided through the data network 245 to the Internet enabled flat panel display 230 for processing by the sports data module 235 with/or without cooperation of the synchronization module 233 (which is optional).

An electronic device in the format of a handheld device 250 can be provided in the form of a familiar "smartphone" or PDA platform (e.g., iPhone, Android devices, etc.) as well as tablets and laptop computers. The handheld device 250 can include a memory 255 for storing operating system 260 and software application modules 152. A display/UI 295 is typically combined in this platform with a touch-sensitive screen (not shown). Sports data in the form of talking replays 206, a football widget 207, and location-based services 208 can be displayed on the display/LH 295. A processor 275 manages and controls operation of the components in the handheld device 250. A synchronization module 285 can be optionally provided as discussed above and enables synchronization of the handheld device with at least one of the server 210 or a first screen such as Internet enabled flat panel display 230. A wireless interface 280 is typically in use to support network communication in such handheld platforms.

A desktop computer 265 can also be utilized as the electronic device used to receive sports data such as talking alerts, football widgets, and spoken scores. A user would typically use a desktop computer in an office environment to access sports data.

Figure 3:
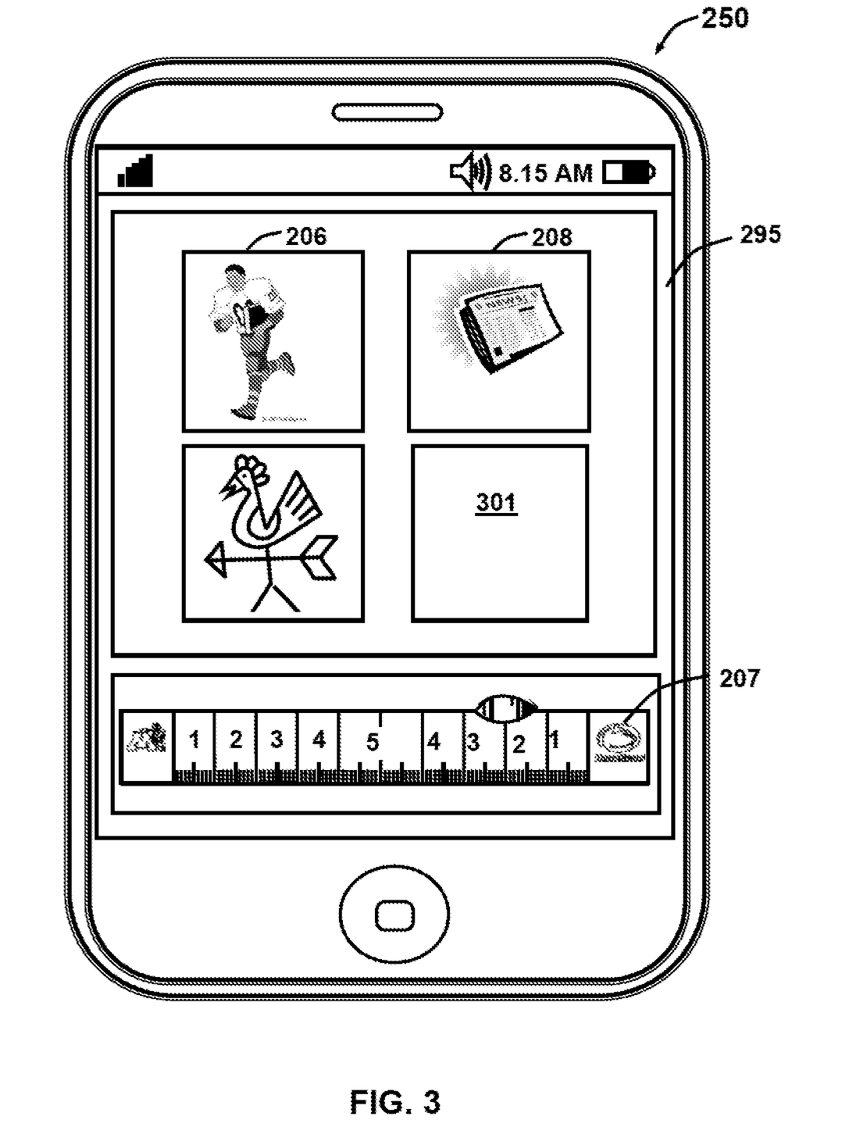
FIG. 3 illustrates a handheld device that can be used to carry out features of the present invention.

Referring to FIG. 3, the electronic device in the form of handheld device 250 is illustrated. The display 295 is shown displaying video 206 associated with a talking replay, a football widget 207, and location-based services 208. Additional sports-related media 301 can be displayed on the handheld device 250. Examples of media can include live video from a sports broadcast, statistical information, team information, memorabilia purchasing information, etc. With respect to the football widget 207, it does not always have to be displayed when sports-related features are operating on the handheld device. The sports widget can fade away within a few second, of showing a change of events (e.g., changes in score, ball location, ball direction) during a monitored football game. For example, whenever there is a change in events, the widget can appear near the bottom or top of the display 295 as a layer over existing programming on the display for up to ten seconds, then fade away and enable programming on the display to continue without ongoing visual interference for the human user. It can be appreciated that the football widget operation as described can also operate as described on a larger device such as the internet-enabled flat panel display. This would be an ideal feature when programming other than a football game (e.g., news, movies, shows) is being viewed on the display screen, but the user of the electronic device would still like to monitor progress in a football game of interest. The revealing and fading widget can be shown at the bottom of the screen for a few seconds to reveal status changes.

Figure 4:
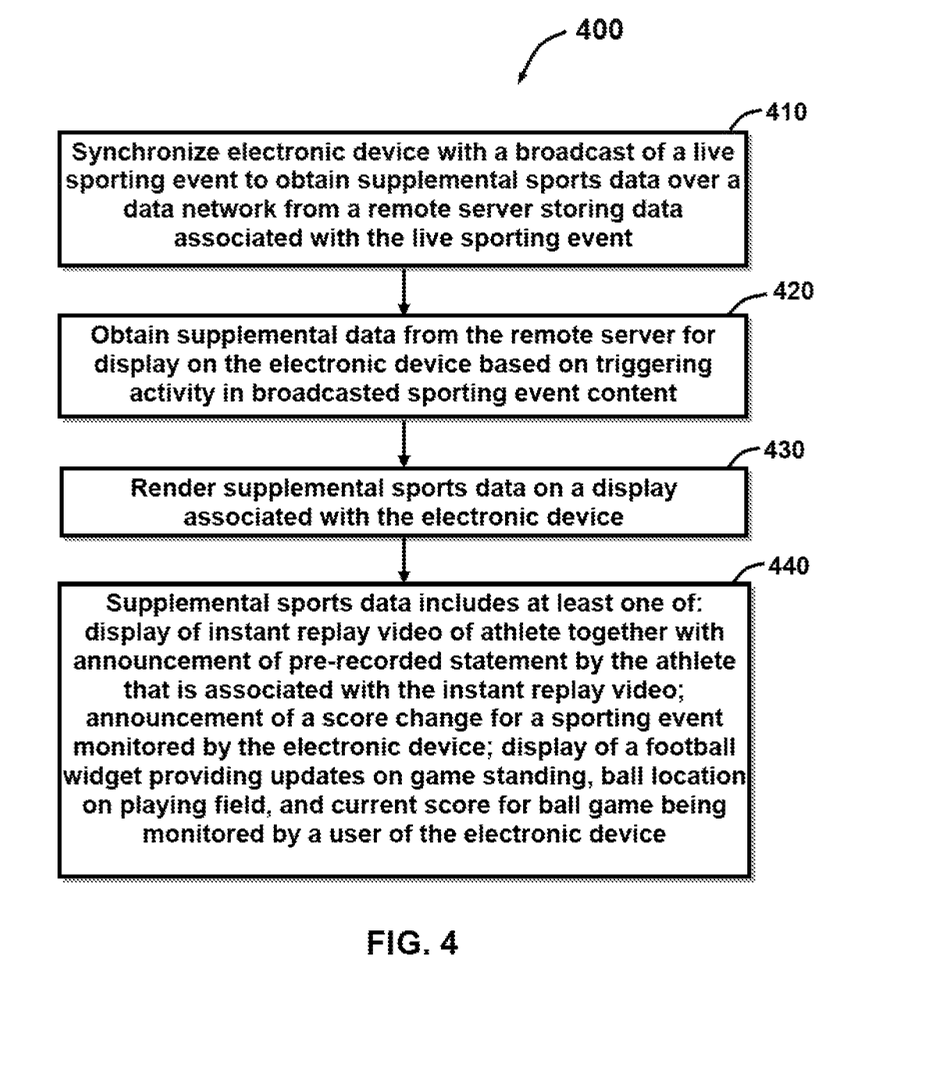
FIG. 4 illustrates a flow diagram of a method for carrying out features of the present invention.
Figure 5:
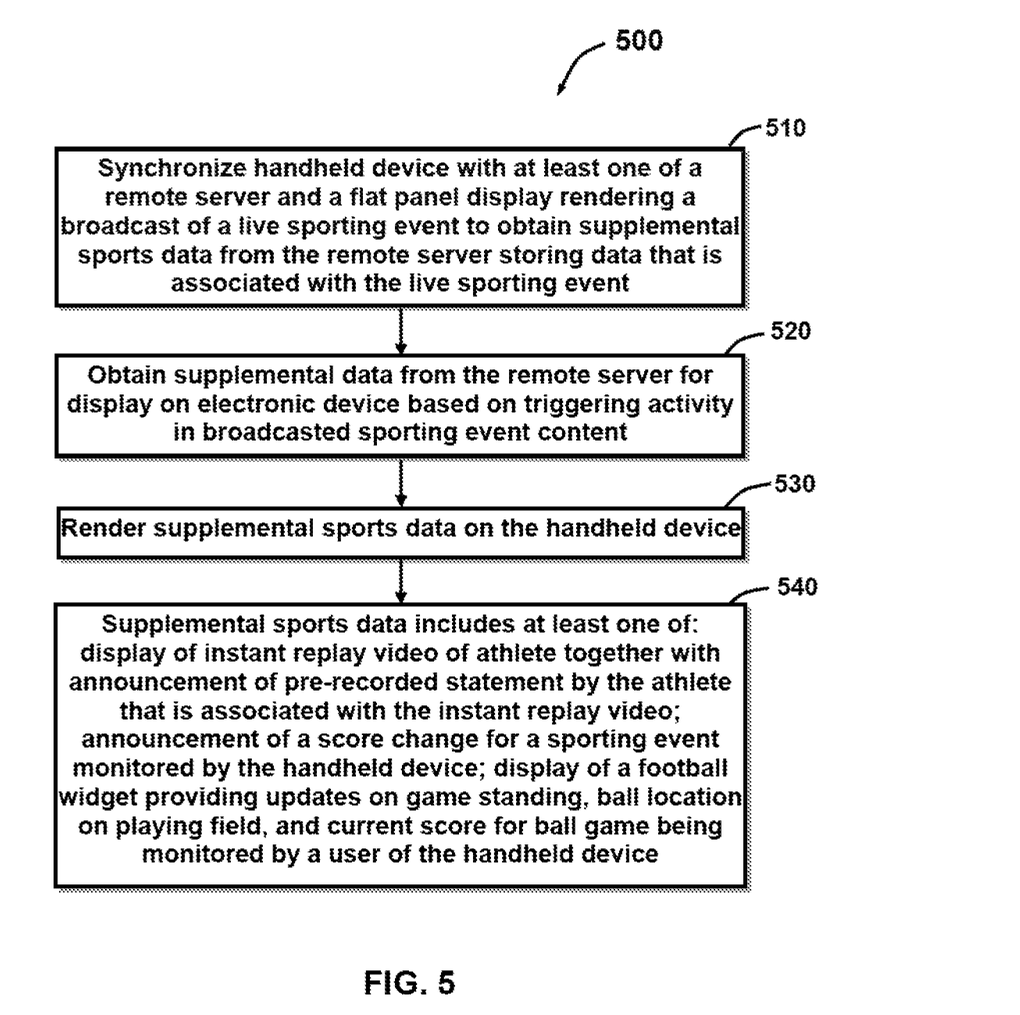
FIG. 5 illustrates a flow diagram of a method for carrying out features of the present invention.
Figure 6:
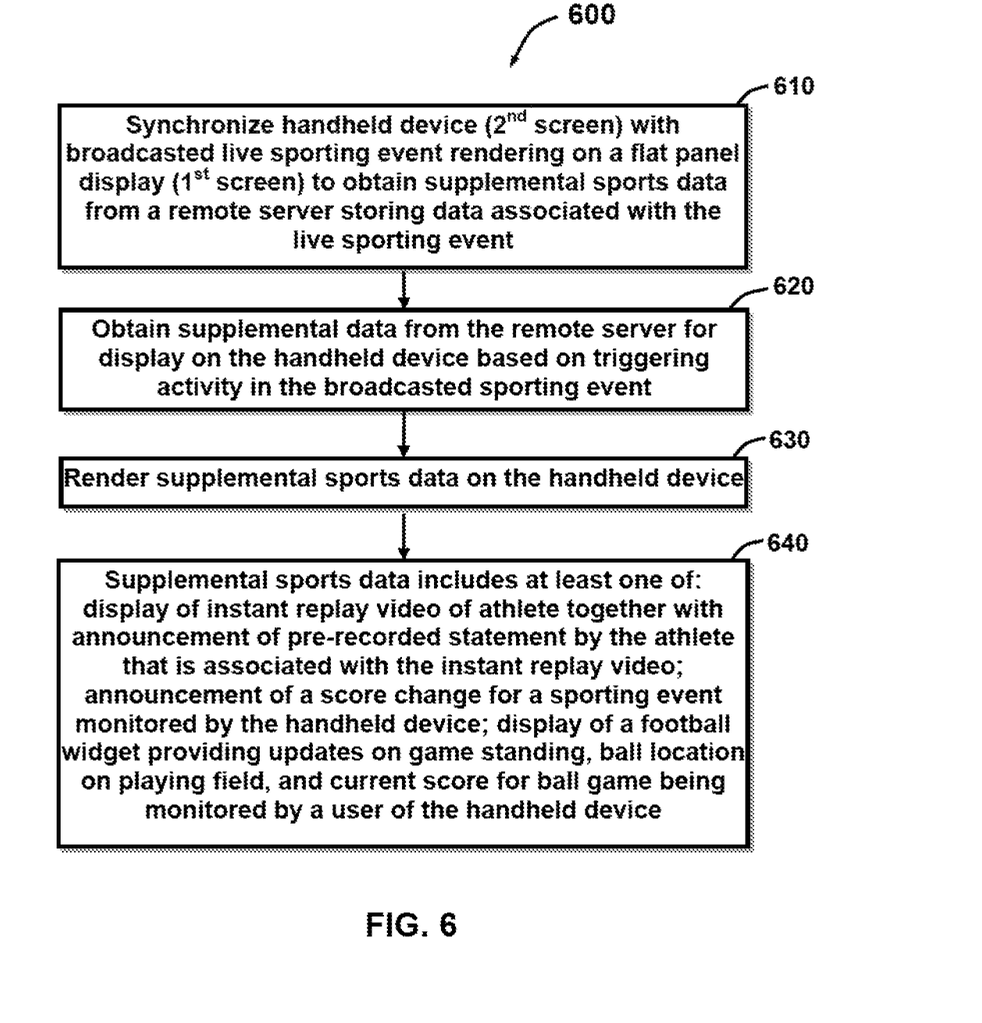
FIG. 6 illustrates a flow diagram of a method for carrying out features of the present invention.

With respect to the following discussion regarding FIGS. 4-6, reference to the term "Synchronize" or "synchronized" should be interpreted to broadly mean that an electronic device is operational to receive supplemental data during the same time period of a broadcasted event and "triggering activity" can be broadly interpreted as an activity occurring during the broadcasted event that warrants replaying. The term "Synchronize" or "synchronized" should also be interpreted to optically mean that an electronic device is operational to receive supplemental data during the same time period of a broadcasted event based on "triggering activity" detected from the broadcast (e.g., audio tags) that automatically causes content to be pushed to an electronic device.

Referring to FIG. 4, a flow diagram of a method for carrying out features of the present invention is illustrated. As shown in block 410, an electronic device can be synchronized with a broadcast of a live sporting event to obtain supplemental sports data over a data network from a server storing data associated with the live sporting event. Supplemental data can be obtained from the server for display on the electronic device based on a triggering activity associated with broadcasted sporting event content as shown in block 420. Supplemental sports data is rendered on a display associated with the electronic device, as shown in block 430. As shown in block 440, supplemental sports data includes at least one of: a display of instant replay video of an athlete together with announcement of pre-recorded statement by the athlete that is associated with the instant replay video; an announcement of a score change for a sporting event monitored by the electronic device; and a display of a football widget providing updates on game standing, ball location on playing field, and current score for a ball game being monitored by a user of the electronic device.

Referring to the flow diagram 500 of FIG. 5, a handheld device is synchronized with at least one of a remote server and flat panel display rendering a broadcast of a live sporting event to obtain supplemental sports data from the remote server storing data that is associated with the live sporting event, as shown in block 510. Then, as shown in block 520, supplemental data can be obtained from the remote server for display on electronic devices based on triggering activity in broadcasted sporting event content. As shown in block 530, supplemental sports data is rendered on the handheld device. As shown in block 540, supplemental sports data is defined to include supplemental sports data including at least one of: display of instant replay video of an athlete together with an announcement of a pre-recorded statement by the athlete that is associated with the instant replay video; an announcement of a score change for a sporting event monitored by the handheld device; and a display of a football widget providing updates on game standing, ball location on playing field, and current score of a ball game being monitored by a user of the handheld device.

Referring to FIG. 6, a flow diagram 600 of a method for synchronization of a second screen with broadcast on a first screen is illustrated. Referring to block 610, a handheld device ($2^{nd}$ screen) is synchronized with broadcasted live sporting event rendering on a flat panel display (1st screen) to obtain supplemental sports data from a remote server storing data associated with the live sporting event. In block 620, supplemental data is obtained from the remote server for display on the handheld device based on triggering activity in the broadcasted sporting event. Then as shown in block 630, supplemental sports data is rendered on the handheld device. Block 640 shows that supplemental sports data can include at least one of: instant replay video of an athlete together with an announcement of a pre-recorded statement by the athlete that is associated with the instant replay video; an announcement of a score change for a sporting event monitored by the handheld device; and a display of a football widget providing updates on game score standing, ball location on playing field, and current score for a ball game being monitored by a user of the handheld device.

Figure 7:
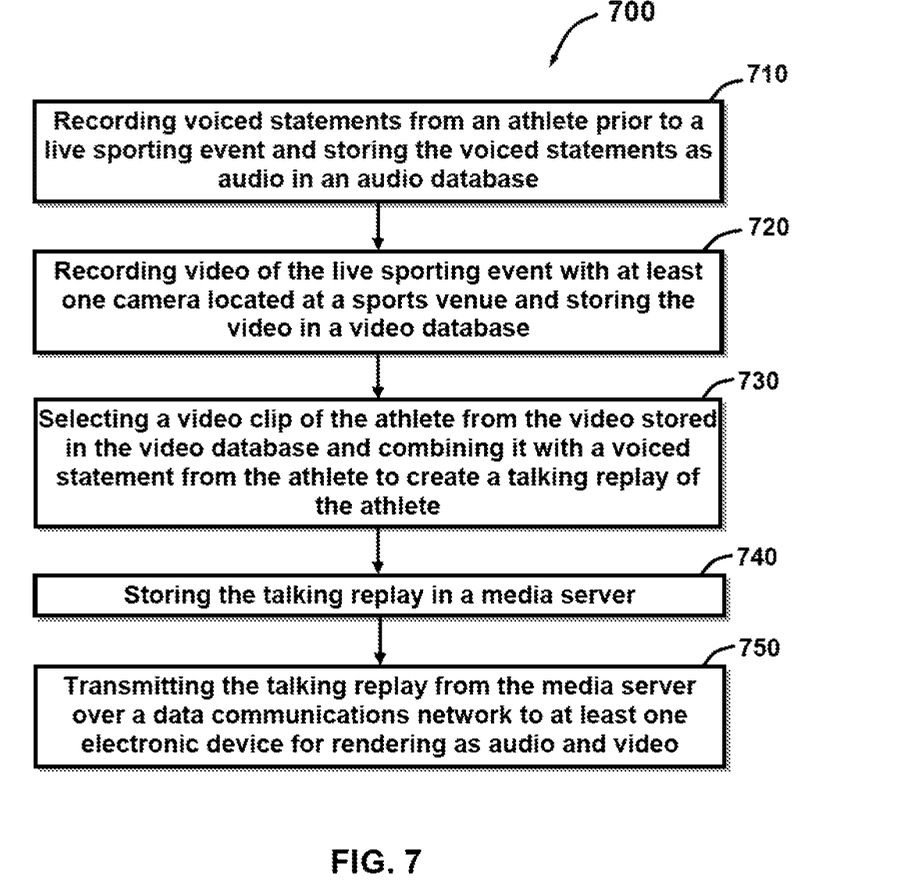
FIG. 7 illustrates a flow diagram of a method for carrying out features of the present invention.

FIG. 7 illustrates a flow diagram 700, in accordance with features of the present invention. As shown in block 710, voiced statements from an athlete are recorded prior to a live sporting event and are stored as audio in an audio database. Referring to block 720, video of the live sporting event is recorded with at least one camera located at a sports venue and is stored in a video database. Then as shown in block 730, a video clip of the athlete is selected from the video stored in the video database and is combined with a voiced statement from the athlete to create a talking replay of the athlete. Referring to block 740, the talking replay is stored in a media server. Then, as shown in block 750, the talking replay is transmitted from the media server together over a data communications network to at least one electronic device for rendering as audio and video.

Figure 8:
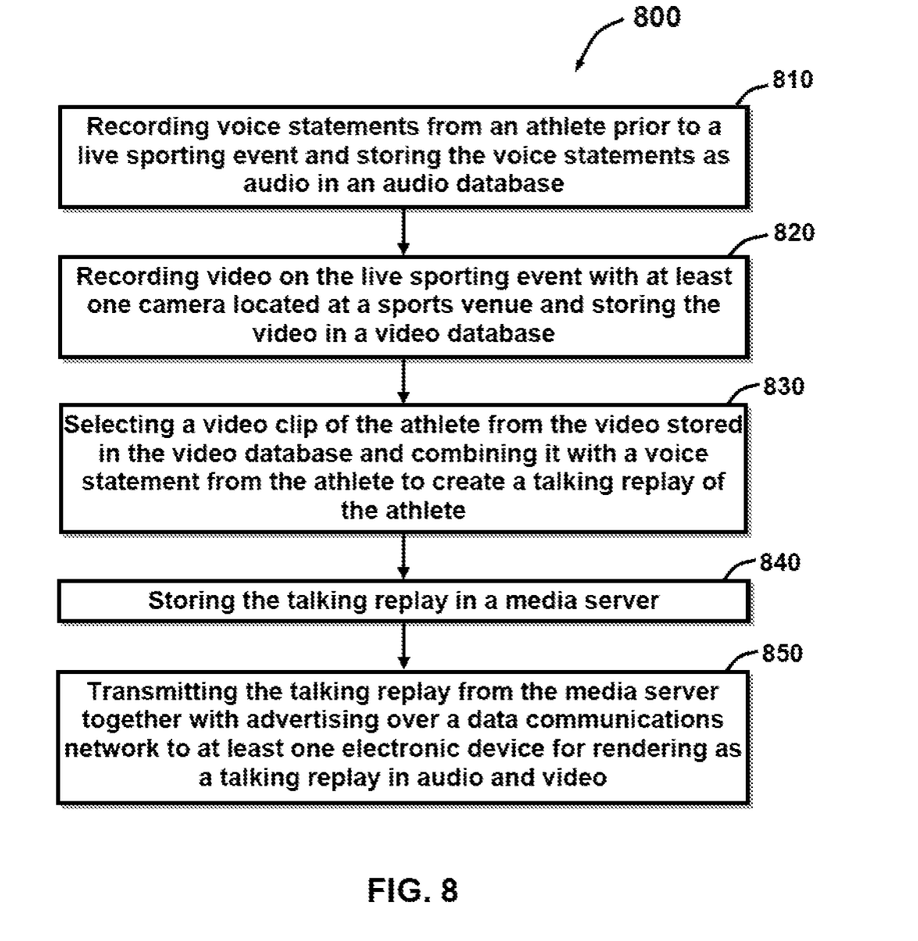
FIG. 8 illustrates a flow diagram of a method for carrying out features of the present invention.

Referring to FIG. 8, voiced statements are recorded from an athlete prior to a live sporting event and are stored as audio in an audio database as shown in block 810. As shown in block 820, video of the live sporting event is recorded with at least one camera located at a sports venue and the video is stored in a video database. As shown in block 830, a video clip of the athlete from the video stored in the video database is selected and then combined with a voiced statement from the athlete to create a talking replay of the athlete. Referring to block 840, the talking replay is stored in a media server. Then, as shown in block 850, the talking replay is transmitted from the media server together with advertising over a data communications network to at least one electronic device for rendering as a talking replay in audio and video.

It should be appreciated that Talking Replay, Football Widget, and Score Sounder can be implemented as software applications, downloadable from a third party application provider (e.g., Apple®, Android®) into a smart phone or tablet. Registration with a content provider, such as media broadcasters (e.g., FOX Sports Network, HBO, CBS Sports, ESPN, etc.) or major league sports organizations (e.g., MLB, NBA, NFL, NHL, etc.) by the application user can be required in order to obtain content such as Talking Replay.

Revenue for application providers, content owners/providers can be obtained by application sales on a subscription basis, and/or via advertising revenue. Advertising can be provided before an application content is rendered or during rendering on part of a display screen (e.g., banner ad).

Data can be automatically received from a server as it becomes available (push), or a handheld device user can request the content (pull). Voiced media can be provided in various languages and can be translated into another language or as a subtitle using a combination of speech-to-text and translation technology. For example, in the case where the sport programming is from Europe or Mexico, it can be translated into English as a digitized (generic) voice or as a subtitle prior to transmission to the user. A user profile during registration can establish what language the audio should be received in (or translated into) by the server prior to transmission to the user.

Social networks can be used to support use and enjoyment of the applications described herein. For example, once a producer is satisfied with an athlete's pre-recorded reading, a copy can be mass texted or posted to alert subscribers (and potential subscribers) of second screen media of the potential comment that may be combined with an instant replay. Thus, another dynamic that has never existed before can come into play in the present invention that enables fan pre-awareness and develops expectations for what can be expected by dedicated followers of an athlete or accepting users of Talking Replay as an application. Post game availability of Talking Replays can also be made available through social networks and can be archived for future enjoyment by fans.

The invention claimed is:

1. A method for synchronizing original content rendered by a first electronic device with supplemental content rendered by a second electronic device of a user, the method comprising:

synchronizing the second electronic device with the first electronic device, wherein the synchronizing enables the second electronic device to obtain the supplemental content from a server storing the supplement content, wherein the supplemental content is associated with the original content;

obtaining the supplemental content associated with the original content from the server for rendering on the second electronic device in response to a triggering activity detected by the second electronic device; and rendering, by the second electronic device, the supplemental content from the server by the second electronic device during at least a portion of a time period in which the first content is rendered by the first electronic device.

2. The method of claim 1, wherein at least a portion of the supplemental content comprises advertisement content associated with the original content.

3. The method of claim 2, wherein the original content is a broadcast of a live event, and the supplemental content comprises supplemental advertising data associated with the live event and obtained by the second electronic device from the remote server over a data network.

4. The method of claim 2, wherein the original content is a website, and the supplemental content comprises supplemental advertising data associated with the website and obtained by the second electronic device from the remote server over a data network.

5. The method of claim 1, wherein synchronizing the second electronic device with the first electronic device further comprises:

monitoring, by the second electronic device, for one or more synchronization tags generated during rendering of the first content by the first electronic device;

detecting a synchronization tag during the rendering of the first content by the first electronic device; and in response to detecting the synchronization tag, the second device obtaining the supplemental content from the server for rendering on the second display of the second electronic device.

6. The method of claim 5, further comprising:

monitoring short range wireless communications generated by the first electronic device; and detecting the synchronization tag in one or more of the short range wireless communications.

7. The method of claim 5, further comprising:

monitoring audio content of the original content rendered by the first electronic device;

detecting the synchronization tag as an audio synchronization tag embedded within the monitored audio content.

8. The method of claim 5, further comprising:

accessing a remote server that provides the original content to the first electronic device for rendering, wherein the synchronization tag is provided by the remote server to the second electronic device during the rendering of the first content by the first electronic device.

9. The method of claim 8, wherein the remote server and the server are the same server computer system.

10. The method of claim 1, wherein the second electronic device comprises a mobile telephone, a table computer, or a laptop computer.

11. A non-transitory computer-readable storage medium embodying computer program code, which when executed by a computer processing system causes the computer processing system to perform operations for synchronizing original content rendered by a first electronic device with supplemental content rendered by a second electronic device of a user, the operations comprising:

synchronizing the second electronic device with the first electronic device, wherein the synchronizing enables the second electronic device to obtain the supplemental content from a server storing the supplement content, wherein the supplemental content is associated with the original content;

obtaining the supplemental content relevant to the original content from the server for rendering on the second electronic device in response to a triggering activity detected by the second electronic device; and rendering, by the second electronic device, the supplemental content from the server on a second display of the second electronic device during at least a portion of a time period in which the first content is rendered on a first display of the first electronic device.

12. The non-transitory computer-readable storage medium of claim 11, wherein at least a portion of the supplemental content comprises advertisement content associated with the original content.

13. The non-transitory computer-readable storage medium of claim 12, wherein the original content is a broadcast of a live event, and the supplemental content comprises supplemental advertising data associated with the live event and obtained by the second electronic device from the remote server over a data network.

14. The non-transitory computer-readable storage medium of claim 12, wherein the original content is a website, and the supplemental content comprises supplemental advertising data associated with the website and obtained by the second electronic device from the remote server over a data network.

15. The non-transitory computer-readable storage medium of claim 11, wherein synchronizing the second electronic device with the first electronic device further comprises:

monitoring, by the second electronic device, for one or more synchronization tags generated during rendering of the first content by the first electronic device;

detecting a synchronization tag during the rendering of the first content by the first electronic device; and in response to detecting the synchronization tag, the second device obtaining the supplemental content from the server for rendering on the second display of the second electronic device.

16. The non-transitory computer-readable storage medium of claim 15, further comprising:

monitoring short range wireless communications generated by the first electronic device; and detecting the synchronization tag in one or more of the short range wireless communications.

17. The non-transitory computer-readable storage medium of claim 15, further comprising:

monitoring audio content of the original content rendered by the first electronic device;

detecting the synchronization tag as an audio synchronization tag embedded within the monitored audio content.

18. The non-transitory computer-readable storage medium of claim 15, further comprising:

accessing a remote server that provides the original content to the first electronic device for rendering, wherein the synchronization tag is provided by the remote server to the second electronic device during the rendering of the first content by the first electronic device.

19. The non-transitory computer-readable storage medium of claim 18, wherein the remote server and the server are the same server computer system.

20. The non-transitory computer-readable storage medium of claim 11, wherein the second electronic device comprises a mobile telephone, a table computer, or a laptop computer.

21. A second electronic device of a user for synchronizing supplemental content rendered by the second electronic device with original content rendered by a first electronic device, the second electronic device comprising:
- a memory; and
- a processor coupled with the memory, the processor configured to:
  - synchronize the second electronic device with the first electronic device, wherein the synchronizing enables the second electronic device to obtain the supplemental content from a server storing the supplement content, wherein the supplemental content is associated with the original content,
  - obtain the supplemental content relevant to the original content from the server for rendering on the second electronic device in response to a triggering activity detected by the second electronic device, and
  - render the supplemental content from the server on a second display of the second electronic device during at least a portion of a time period in which the first content is rendered on a first display of the first electronic device.

* * * * *